Nov. 1, 1966        E. E. HAWES        3,282,456
                   CONVEYOR SYSTEM
Filed May 28, 1964                    2 Sheets-Sheet 2
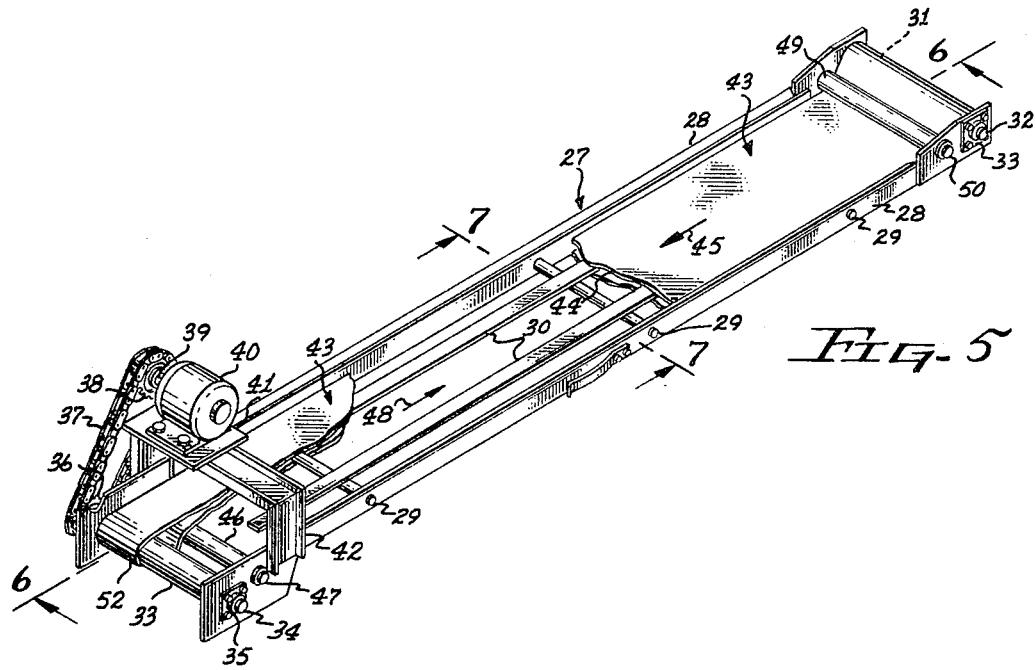
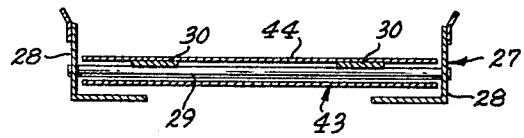
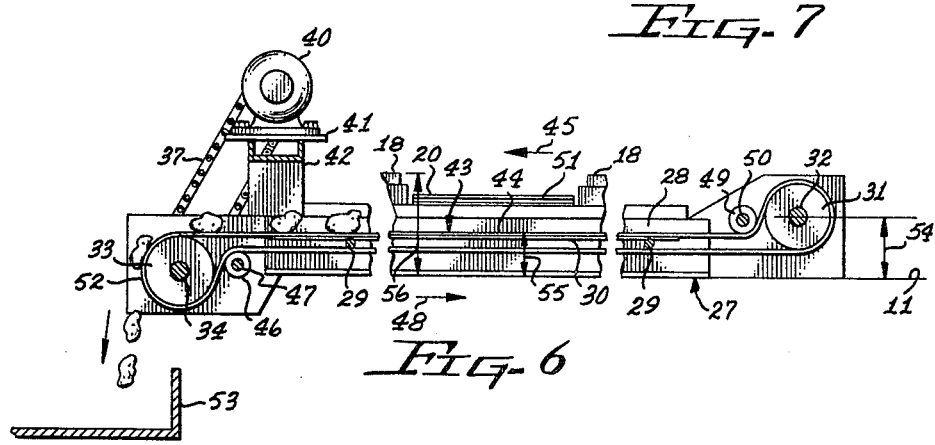
INVENTOR.
ERNEST E. HAWES
BY
Willard S. Grout
ATTORNEY

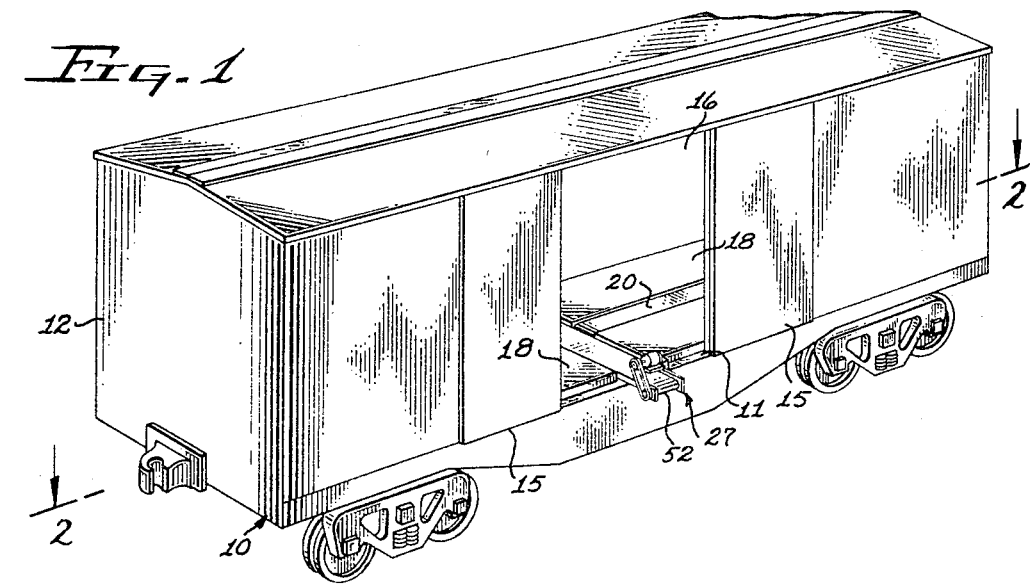
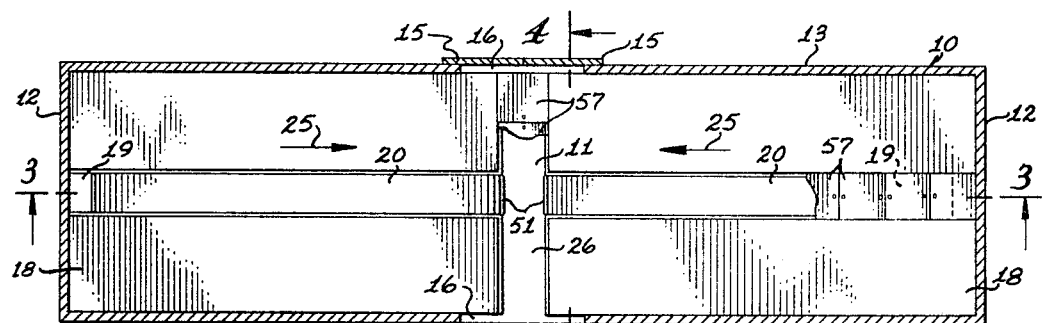
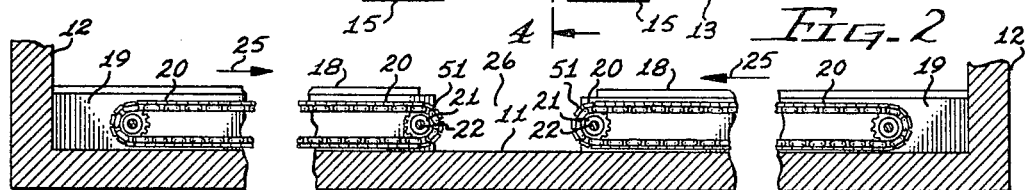
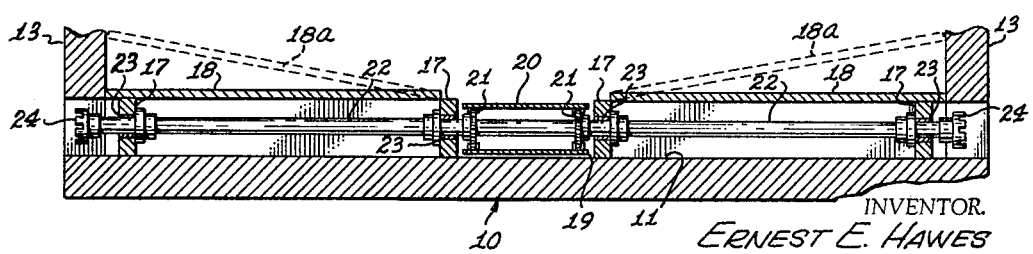

United States Patent Office 3,282,456
Patented Nov. 1, 1966

3,282,456
CONVEYOR SYSTEM
Ernest E. Hawes, Rte. 1, Queen Creek, Ariz.
Filed May 28, 1964, Ser. No. 370,811
2 Claims. (Cl. 214—519)

This invention pertains to improvements in conveyor systems and is particularly directed to improvements in a conveyor for unloading bulk materials from freight cars and the like.

One of the objects of this invention is to provide a conveyor system which can automatically completely unload bulk materials such as potatoes and the like from railroad freight cars, trucks, and the like.

Another object of this invention is to provide a conveyor system which takes up a minimum of load carrying space in a freight car and the like.

Still another object is to provide a transverse lateral conveyor for a freight car having a small vertical height and adapter to be located below the effective floor level supporting the load.

It is also an object to provide a specially constructed floor with longitudinal and transverse conveyors particularly adapted to the complete and automatic unloading of bulk material from a freight car and the like.

And a further object is to provide a conveyor system for a freight car and the like which does not materially interfere with the use of the freight car for crated and boxed freight when bulk material is not to be shipped in the car.

Further features and advantages of this invention will appear from a detailed description of the drawings in which:

FIG. 1 is a perspective view of a freight car incorporating a conveyor system of this inventon.

FIG. 2 is an enlarged plan view of the floor of the freight car indicated by the line 2—2 in FIG. 1.

FIG. 3 is an enlarged longitudinal section on the line 3—3 of FIG. 2.

FIG. 4 is an enlarged transverse section on the line 4—4 of FIG. 2.

FIG. 5 is a perspective view of the transverse conveyor.

FIG. 6 is an enlarged longitudinal section on the line 6—6 of FIG. 5.

FIG. 7 is an enlarged transverse section on the line 7—7 of FIG. 5.

As an example of one embodiment of this invention there is shown a freight car 10 having a floor 11, ends 12, sides 13 and roof 14. The sides 13 are provided with the usual sliding doors 15 for access to the interior of the car through the door opening 16.

On top of suitable joists 17 resting upon the existing floor 11 of the freight car is the load supporting floor 18 having longitudinally extending channels 19 in which are located the longitudinal belt or chain conveyor 20 carried on appropriate sprockets 21 fixed to the operating shafts 22 journaled in suitable bearings 23 carried in the joists 17. The outer ends of the shafts 22 are provided with suitable couplings 24 exterior of the freight car 10 for application of power to operate the longitudinal conveyors 20 toward the center of the car as indicated by the direction arrows 25.

A transverse conveyor channel 26 is formed intermediate the ends of the floor 18 in alignment with the door openings 16 in which may be inserted or removed the specially constructed transverse conveyor indicated generally at 27 consisting of the side rails 28 rigidly secured together by suitable tie rods 29, and belt support strips 30. At the rear end of the rails 28 is mounted a rear belt cylinder 31 on a suitable shaft 32 journaled in suitable bearings 33 supported in the rear ends of the side rails 28. A similar belt cylinder 33 is fixed on the shaft 34 suitably journaled in bearings 35 in the front ends of the side rails 28. A sprocket 36 is fixed to the outer end of the shaft 34 over which operates a drive chain 37 in turn operating over the drive sprocket 38 fixed on the output shaft 39 of a suitable drive motor or engine 40 fixed to the mounting plate 41 carried on the bracket 42 fixed to the front ends of side rails 28.

A suitable conveyor belt 43 has its top horizontal load carrying portion moving forwardly in the direction indicated by the arrow 45 while supported on the strips 30 and downwardly over the front belt cylinder 33 and then upwardly and rearwardly over the front idler roller 46 suitably journaled on a shaft 47 supported in the front ends of the side rails 28 so that the belt 43 returns in the direction indicated by the arrow 48, running immediately under the upper belt load carrying portion 44 and under the strips 30 and tie rods 29.

At the rear of the side rails 28 and in front of the rear belt cylinder 31 is the rear idler roller 49 suitably journaled on a shaft 50 carried in the side rails 28, under which the belt moves in the direction 48 and then upwardly over the top of the rear belt cylinder 31 and then forwardly down under the rear idler roller 49 to begin the forward travel of the top horizontal load carrying portion 44 in the direction 45.

The entire transverse conveyor assembly described may be placed on the existing floor 11 of the freight car 10 in the transverse conveyor channel 26 so that the load carrying portion 44 thereof is below the inner discharge ends 51 of the longitudinal conveyors 20. The outer or front discharge end 52 of the conveyor belt 43 projects outwardly of the freight car door opening 16 for discharging the material in the car into a suitable receptacle or truck body 53. This is accomplished by placing the front belt cylinder 33 outside of the freight car door opening 16 and below the rear belt cylinder 31 as indicated at 54 so as to provide a very low height 55 between the existing car floor 11 and the top horizontal load carrying portion 44 of the belt 43 so as to conserve the volume of the car for maximum load carrying capacity. As a result of this unique construction for the transverse conveyor 27 the overall floor height 56 of the load supporting floor 18 above the existing freight car floor is minimized so that when appropriate floor plate covers 57 are placed over the longitudinal conveyor channels 19 and the transverse channel 26 for standard use of the car for boxed and crated materials and goods, a minimum of volume of the car is taken up by the conveyor system. Further, by arranging the load supporting floors to be placed in a sloped position as shown at 18a, FIG. 4, when handling bulk materials such as potatoes and the like, operation of the conveyors 20 and 27 effect automatic complete unloading of the freight car of its contents.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A conveyor system for unloading bulk materials from freight cars having:
   (A) an existing floor,
   (B) ends and sides connected to said existing floor including openings in said sides,
   (C) a load supporting floor mounted on and immediately above said existing floor, (D) longitudinal conveyor channels formed in said load supporting floor,
(E) longitudinal conveyors in said longitudinal conveyor channels discharging toward each other at the center of said load supporting floor,
(F) a transverse conveyor channel formed intermediate the ends of said load supporting floor intersecting said aforementioned channels,
(G) a demountable transverse conveyor adapted to be placed in and removed from said transverse conveyor channel discharging materials received from said longitudinal conveyors out through said door openings so as to unload the contents from the freight car,
(H) said transverse conveyor comprising a frame,
(I) a rear belt cylinder journaled at the rear end of said frame,
(J) a rear idler roller journaled on said frame adjacent to and in front of said rear belt cylinder,
(K) a front belt cylinder journaled at the front end of said frame outside of said freight car existing floor and below said rear belt cylinder,
(L) a front idler roller journaled on said frame adjacent to and behind said front idler roller,
(M) belt support strips fixed on said frame extending between said idler rollers,
(N) a conveyor belt having a top horizontal load carrying portion slidingly supported on said strips moving forwardly toward said front belt cylinder, then around and under and up over said front idler roller and then rearwardly closely adjacent the underside of said belt support strips to the bottom of said rear belt cylinder, then up and over said rear belt cylinder and finally down and under said rear idler roller,
(O) and means for rotating said front belt cylinder to cause operative travel of said transverse conveyor belt.

2. A conveyor system for unloading bulk materials from freight cars having:
(A) an existing floor,
(B) ends and sides connected to said existing floor including openings in said sides,
(C) a load supporting floor mounted on and immediately above said existing floor,
(D) longitudinal conveyor channels formed in said load supporting floor,
(E) longitudinal conveyors in said longitudinal conveyor channels discharging toward each other at the center of said load supporting floor,
(F) a transverse conveyor channel formed intermediate the ends of said load supporting floor intersecting said aforementioned channels,
(G) a demountable transverse conveyor adapted to be placed in and removed from said transverse conveyor channel discharging materials received from said longitudinal conveyors out through said door openings so as to unload the contents from the freight car,
(H) said transverse conveyor comprising a frame,
(I) a rear belt cylinder journaled at the rear end of said frame,
(J) a rear idler roller journaled on said fame adjacent to and in front of said rear belt cylinder,
(K) a front belt cylinder journaled at the front end of said frame outside of said freight car existing floor and below said rear belt cylinder,
(L) a front idler roller journaled on said frame adjacent to and behind said front idler roller,
(M) belt support strips fixed on said frame extending between said idler rollers,
(N) a conveyor belt having a top horizontal load carrying portion slidingly supported on said strips moving forwardly toward said front belt cylinder, then around and under and up over said front idler roller and then rearwardly closely adjacent the underside of said belt support strips to the bottom of said rear belt cylinder, then up and over said rear belt cylinder and finally down and under said rear idler roller,
(O) means for rotating said front belt cylinder to cause operative travel of said transverse conveyor belt,
(P) and means exterior of the freight car interior adapted to be actuated to operate said longitudinal conveyors.

References Cited by the Examiner
UNITED STATES PATENTS

| | | | |
|---|---|---|---|
| 875,385 | 12/1907 | Smith | 198—2 |
| 1,208,067 | 12/1916 | Williams | 198—80 |
| 1,551,221 | 8/1925 | Sholes | 198—80 |
| 2,503,129 | 4/1950 | Pautz | 214—520 |
| 3,107,804 | 10/1963 | Cox | 214—83.36 X |

GERALD M. FORLENZA, *Primary Examiner.*

ALBERT J. MAKAY, *Examiner.*